United States Patent [19]

Gaiardo

[11] Patent Number: 5,318,071
[45] Date of Patent: Jun. 7, 1994

[54] HIGH-SPEED THREE-WAY SOLENOID VALVE FOR PRESSURIZED FLUID, SUCH AS COMPRESSED AIR CIRCUITS

[75] Inventor: Mario Gaiardo, Ivrea, Italy
[73] Assignee: Matrix S.r.l., Ivrea, Italy
[21] Appl. No.: 801,687
[22] Filed: Dec. 2, 1991
[30] Foreign Application Priority Data
Nov. 30, 1990 [IT] Italy ................. 67954 A/90
[51] Int. Cl.⁵ ............................................ F16K 11/00
[52] U.S. Cl. ............................ 137/625.65; 137/625.44
[58] Field of Search ........................ 137/625.44, 625.65

[56] References Cited
U.S. PATENT DOCUMENTS

| 2,995,149 | 8/1961 | Pendleton | 137/625.44 X |
| 3,722,531 | 3/1973 | Verhart | 137/271 |
| 4,527,590 | 7/1985 | Kolze | 137/625.65 X |
| 4,534,381 | 8/1985 | Hozumi et al. | 137/625.65 |
| 4,765,370 | 8/1988 | Ariizumi et al. | 137/625.65 |
| 5,048,564 | 9/1991 | Galardo | . |

FOREIGN PATENT DOCUMENTS

0235451  9/1987  European Pat. Off. .
1117352  6/1968  United Kingdom ........... 137/625.44

Primary Examiner—John C. Fox
Attorney, Agent, or Firm—Palmatier, Sjoquist & Helget

[57] ABSTRACT

A solenoid valve comprising an inlet conduit coaxial with an exhaust conduit; and an on-off element supported on the anchor of an electromagnet and moving substantially along the common axis of the two conduits for alternately connecting the inlet conduit and the exhaust conduit to an outlet conduit via a connecting compartment. The anchor normally closes the inlet conduit via flexible means, such as a permanent magnet in the magnetic circuit of the electromagnet, magnetized the opposite way to when the electromagnet is energized. The action of the electromagnet is such as to substantially eliminate that of the magnet on the anchor, which is thus set rapidly to the closed position over the exhaust conduit.

4 Claims, 6 Drawing Sheets

HIGH-SPEED THREE-WAY SOLENOID VALVE FOR PRESSURIZED FLUID, SUCH AS COMPRESSED AIR CIRCUITS

BACKGROUND OF THE INVENTION

The present invention relates to a high-speed three-way solenoid valve for pressurized fluid, such as compressed air circuits.

Three-way solenoid valves are particularly useful for pneumatic circuits requiring exhaust of the fluid, e.g. from the control chamber of an actuating cylinder. On such valves, the response time of the moving element in relation to the control signal is extremely important, both when opening and closing the valve, in that it is this which determines the maximum operating frequency of the valve.

On one known type of three-way solenoid valve, the moving element is controlled by a piston having a minimum response time of about 8–10 ms, which is obviously insufficient for applications requiring a response time of about one millisecond.

Three-way valves are also known comprising a servo and secondary valve, wherein the moving element is controlled by a servomechanism. These, however, are invariably highly complex and expensive.

SUMMARY OF THE INVENTION

It is an object of the present invention to provide a highly straightforward three-way solenoid valve designed to overcome the aforementioned drawbacks typically associated with known valves.

According to the present invention, there is provided a solenoid valve comprising an inlet conduit, an outlet conduit, and an exhaust conduit, said outlet conduit being selectively connectable to said inlet conduit and said exhaust conduit; characterised by the fact that it comprises an on-off element moving between a first and second operating position, for alternately closing said inlet conduit and said exhaust conduit; and an electromagnet controlling said element.

BRIEF DESCRIPTION OF THE DRAWINGS

A number of preferred non-limiting embodiments of the solenoid valve and relative compressed air circuit will be described by way of example with reference to the accompanying drawings, in which.

DETAILED DESCRIPTION OF THE INVENTION

Figures 1, 2:
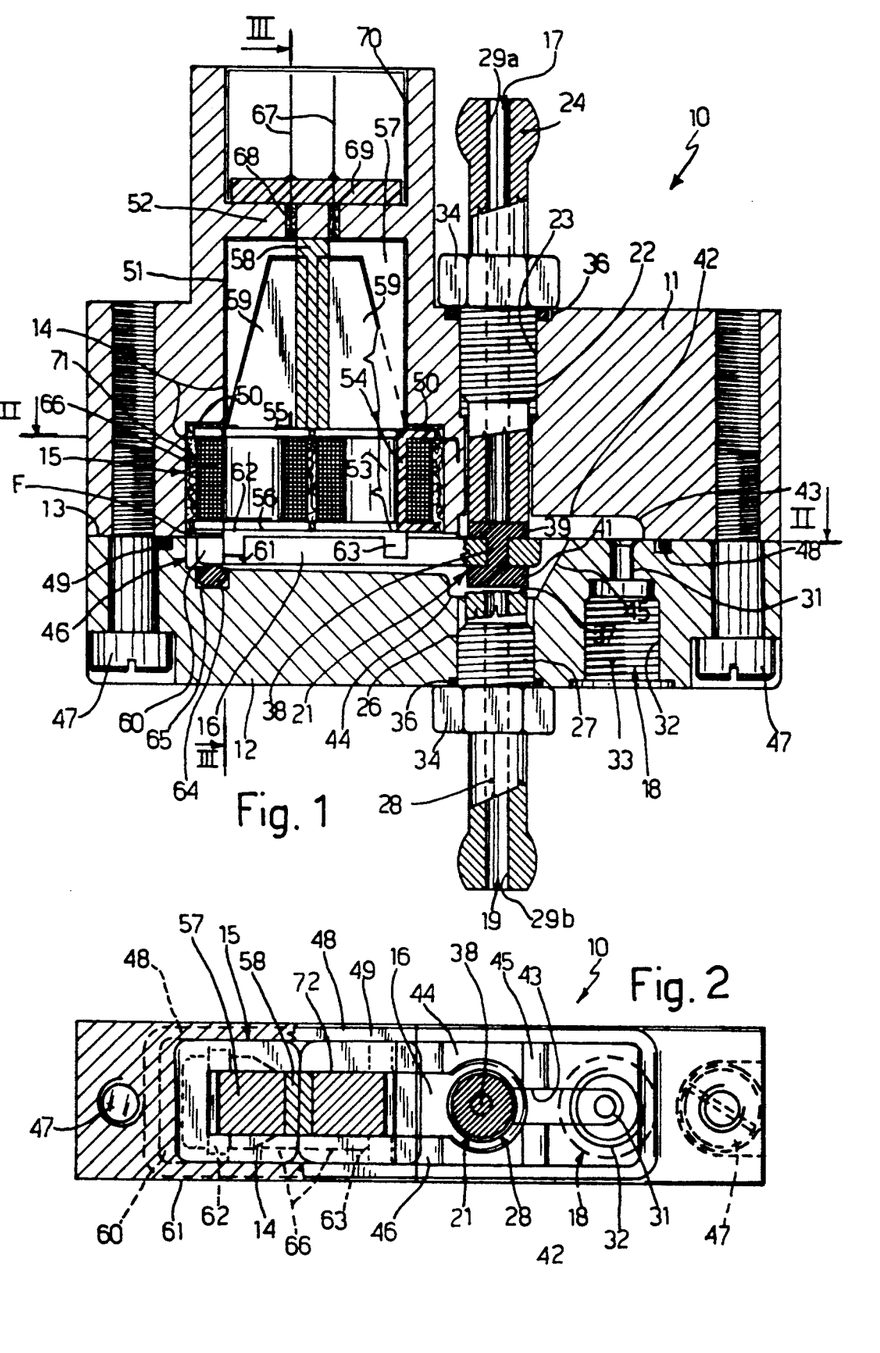
FIG. 1 shows a center cross section of a first embodiment of a three-way solenoid valve in accordance with the present invention.
FIG. 2 shows a section along line II—II in FIG. 1.
Figures 3, 6, 7:
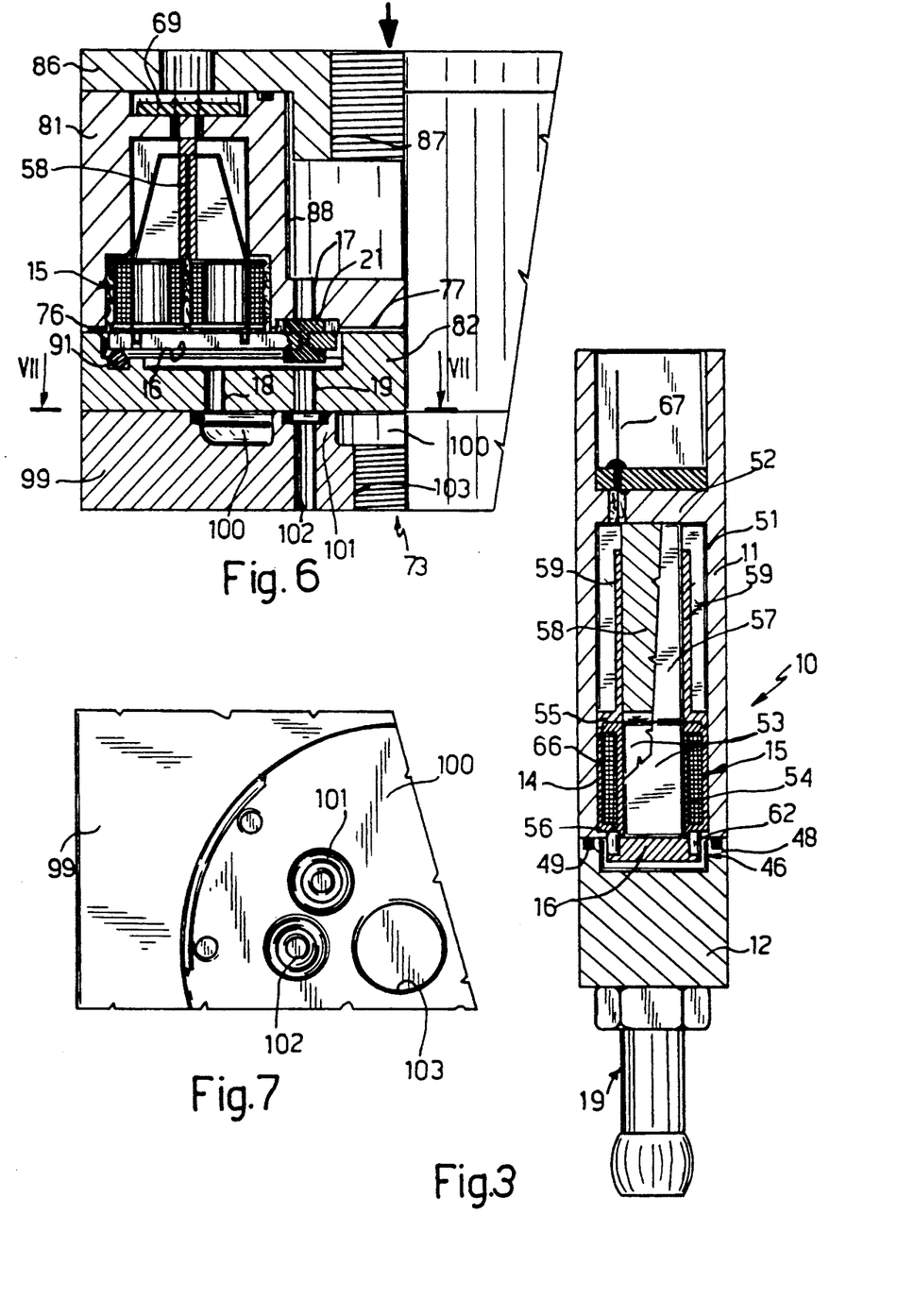
FIG. 3 shows a section along line III—III in FIG. 1.
FIG. 6 shows the FIG. 5 section in a first operating position.
FIG. 7 shows a partial section along line VII—VII in FIG. 6.

Number 10 in FIGS. 1 to 3 indicates a three-way solenoid valve comprising an upper body 11 and a lower body 12, both made of nonmagnetic material and mating on a flat annular surface 13 having a rectangular outer edge. Upper body 11 presents a seat 14 housing an electromagnet 15 for activating an anchor 16 controlling solenoid valve 10; and a compressed air inlet conduit indicated as a whole by 17.

Lower body 12 presents an air outlet conduit 18 to a user device (not shown); and an exhaust conduit 19 for externally exhausting air from the user device. Exhaust conduit 19 is parallel to outlet conduit 18 and coaxial with inlet conduit 17. An on-off element 21 on anchor 16 moves substantially along the common axis of conduits 17 and 19, for alternately connecting inlet conduit 17 and exhaust conduit 19 to outlet conduit 18. In particular, inlet conduit 17 consists of a hole 22 in body 11, having a threaded portion in which is screwed a threaded portion 23 of an inlet nozzle 24, e.g. made of metal. Exhaust conduit 19 in turn consists of a threaded hole 26 in body 12, in which is screwed a threaded portion 27 of an exhaust nozzle 28. Each nozzle 24, 28 presents a respective internal orifice 29a, 29b of a given diameter.

Finally, outlet conduit 18 consists of an internal orifice 31 of substantially the same diameter as orifices 29a, 29b, and coaxial with a larger-diameter threaded hole 32 in which is screwed an outlet nozzle 33 connected in known manner to the user device.

Each nozzle 24, 28 is secured and sealed to respective body 11, 12 by a threaded nut 34 forming one piece with the nozzle and acting on an annular seal 36. Moreover, each nozzle 24, 28 terminates internally in a raised edge 37 sealed by on-off element 21. Element 21 is formed of elastomeric material directly on hole 38 in anchor 16, and presents two opposed disks 39, 41 respectively engaging edges or mouths 37 of nozzles 24, 28, said disks 39, 41 having a diameter greater than the diameter of the hole 38. Between bodies 11 and 12, a compartment 42 is formed connecting orifice 31 to orifices 29a, 29b, and consisting of a groove 43 in body 11, and a recess 44 in body 12. Recess 44, on one side, presents an incline 45 for assisting air flow from orifice 31 of outlet conduit 18 to orifice 29b of exhaust nozzle 28, and, on the other, communicates with a seat 46 formed in body 12 and housing anchor 16.

Bodies 11 and 12 are connected by means of two screws 47. Surface 13 of body 12 presents a groove 48 surrounding compartment 42 and, therefore, seat 46 and orifice 31, and housing a seal 49 which is pressed by screws 47 for sealing bodies 11 and 12.

Seat 14 of electromagnet 15 has a substantially rectangular section, and presents two shoulders 50 defining a compartment 51 extending upwards and closed by an end wall 52. Electromagnet 15 comprises two parallel cores 53 made of ferromagnetic material with a low residual flux density, e.g. soft iron, and parallel to the common axis of conduits 17 and 19. Each core 53 is fitted inside a spool 54 having an upper flange 55 and a lower flange 56, extends slightly beyond lower flange 56, and presents an appendix 57 extending upwards inside compartment 51 as far as end wall 52.

Between appendixes 57, there is provided a prismatic permanent magnet 58 also extending as far as end wall 52, so as to form, between two bodies of magnetizable material, a permanent magnet pack retained laterally by two substantially trapezoidal-shaped tabs 59 extending from flange 55.

Permanent magnet 58 acts as a flexible means for normally maintaining element 21 contacting orifice 29a of inlet conduit 17. Magnet 58, in fact, normally keeps appendixes 57, and therefore cores 53, magnetized to such a degree as to normally maintain anchor 16 resting on the bottom-most surfaces of cores 53, and element 21 contacting orifice 29a of inlet conduit 17, despite the pressure of the compressed air in conduit 17, and as shown in FIG. 1.

Anchor 16 consists of a substantially rectangular plate made of ferromagnetic material with a low residual flux density, and having two recesses 61 close to end 60. Lower flange 56 presents a first pair of prismatic appendixes 62 extending towards seat 46 and engaging recesses 61 for preventing anchor 16 from moving longitudinally or transversely (perpendicular to the FIG. 1 plane). Flange 56 also presents a second pair of prismatic appendixes 63 for guiding anchor 16, and extending towards seat 46 to the side of lateral edges 72 of anchor 16. End 60 normally rests on a bar of elastomeric material housed inside a groove 65 in seat 46, and compressed and deformed elastically by end 60. Spools 54 are wound with respective electric coils 66, which, when energized, produce a magnetic field in opposition to, and the total of which substantially eliminates, that of permanent magnet 58. The electric terminals 67 of coils 66 fit through two holes 68 in wall 52, and are welded to a printed circuit board 69 for connection to the electrical supply.

Board 69 is housed in a seat 70, e.g. glued to the outer surface of wall 52, and spools 54 complete with coils 66 are embedded inside seat 14 in a layer of resin 71. The portions of terminals 67 fitted through holes 68 are also embedded in resin.

Solenoid valve 10 operates as follows.

As already stated, permanent magnet 58, via cores 53, normally maintains disk 39 of on-off element 21 contacting orifice 29a of inlet conduit 17. As anchor 16 rests on the bottom surfaces of cores 53, thus producing a minimum air gap, the attraction exerted is maximum and sufficient for maintaining anchor 16 in the FIG. 1 position, despite the pressure exerted on disk 39 by the compressed air in inlet conduit 17.

Bar 64 is therefore compressed slightly by end 60 of anchor 16, and element 21 normally maintains inlet conduit 17 closed, and outlet conduit 18 open and communicating with exhaust conduit 19 via groove 43. When electromagnet 15 is energized, coils 66 produce a magnetic field in opposition to, and substantially eliminating, that produced by permanent magnet 58 in cores 53, so that, assisted by the elastic action of bar 64, the air pressure in inlet conduit 17 turns anchor 16 clockwise about a fulcrum F (defined by the lower edge of core 53 closest to end 60 of anchor 16).

On-off element 21 therefore moves substantially along the axis of conduits 17 and 19, until disk 41 contacts orifice 29b, thus closing exhaust conduit 19. At the same time, element 21 opens orifice 29a of inlet conduit 17, which, via groove 43, thus communicates with outlet conduit 18 for activating the user device in a first direction.

When electromagnet 15 is de-energized, the magnetic field of magnet 58 magnetizes cores 53, which attract and turn anchor 16 anticlockwise about fulcrum F; element 21 moves back into contact with orifice 29a, thus closing inlet conduit 17 and opening exhaust conduit 19; and the compressed air formerly supplied to the user device via outlet conduit 18 now flows along the same conduit 18, and is exhausted externally via groove 43 and exhaust conduit 19.

The arrangement of the component parts of solenoid valve 10, the magnetic field produced by coils 66, and the magnetic field of magnet 58 are so selected as to minimise the response time of valve 10, which, with the configuration described above by way of example, has been about 1 ms.

The solenoid valve described above may constitute one of a number of base elements packed together to form a multiple solenoid valve, for selectively activating a number of similar user devices. Such a multiple valve may present an inlet interface connected to bodies 11 of two or more inlet conduits 17 for supplying the latter via a common supply chamber.

An outlet interface may also be connected to bodies 12 of two or more base elements, thus enabling the direction of outlet conduits 18 to a common chamber for activating and selectively varying supply to a single user device. Alternatively, a substantial simplification in design may be afforded by directing the exhaust conduits 19 of the various base elements to a common chamber.

Figure 4:
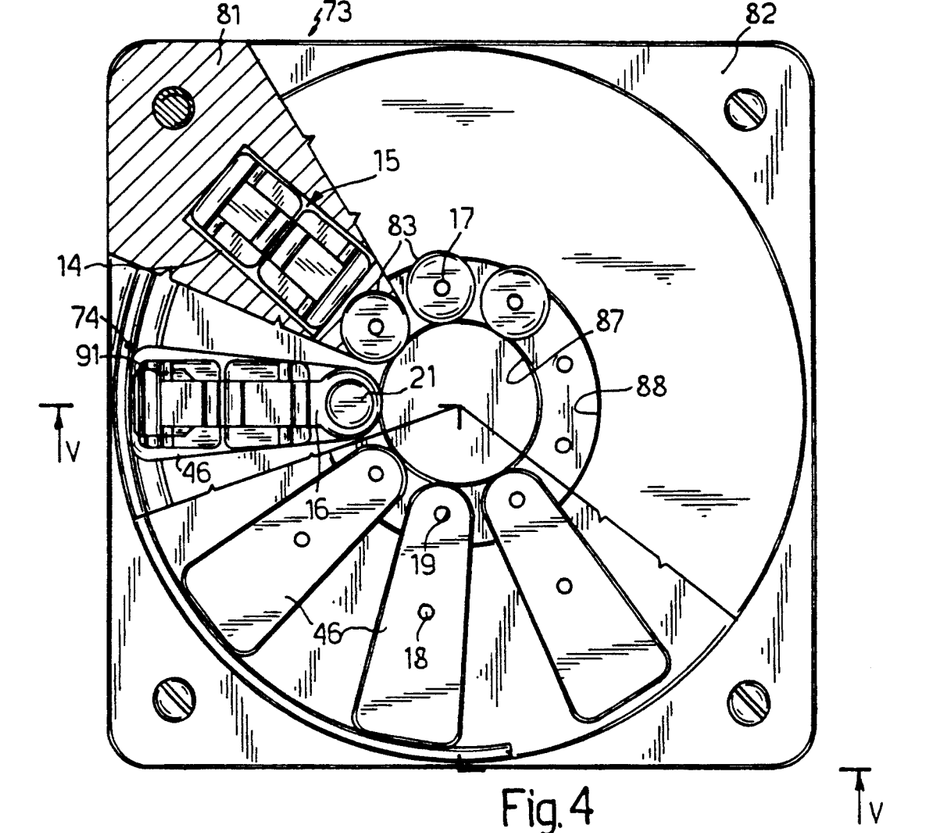
FIG. 4 shows a partially sectioned plan view of a multiple solenoid valve according to a further embodiment of the present invention.
Figure 5:
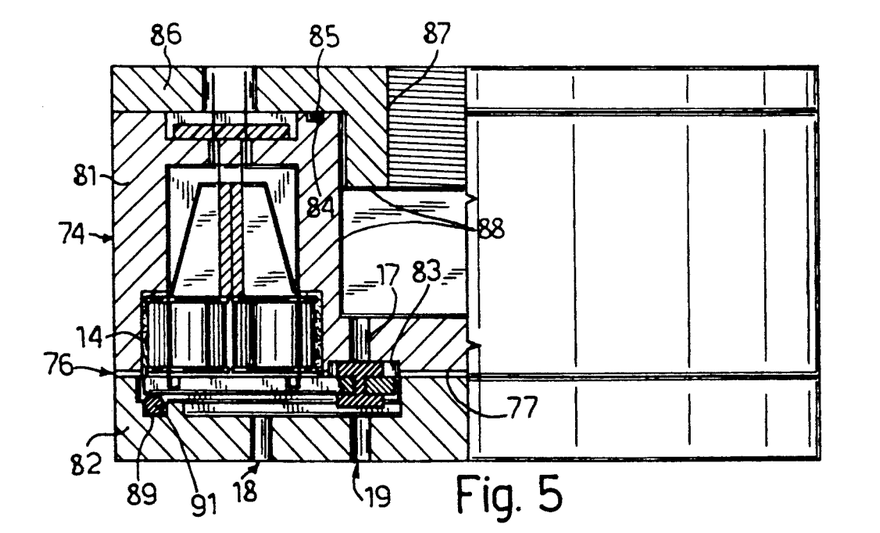
FIG. 5 shows a section along line V—V in FIG. 4.

FIGS. 4 and 5 show a further embodiment of a multiple solenoid valve 73 featuring base elements 74 arranged radially, for example, in a group of nine. Base element 74 comprises an electromagnet 15 with a permanent magnet 69 and an anchor 16 identical to those of solenoid valve 10, therefore requiring no further description, and the component parts of which are indicated using the same numbering system.

Solenoid valve 73 in this case comprises two bodies 81 and 82 common to all of base elements 74, and connected and sealed to each other by means of screws 80, an annular seal 76, and a central sheet seal 77. Body 81 presents a number of radial seats 14, each housing a respective electromagnet 15, and each associated with a recess 83 located by way of a continuation of respective inlet conduit 17.

On top, body 81 presents a groove 84 housing a seal 85 common to all of base elements 74, over which is fitted a plate 86 constituting an inlet interface. Plate 86 presents a single central conduit 87 connected to the compressed air supply, and, together with body 81, forms a supply chamber 88 common to all of inlet conduits 17. Body 82 in turn presents a number of radial seats 46, each housing a respective anchor 16, and inside each of which terminate an exhaust conduit 19, coaxial with inlet conduit 17, and an outlet conduit 18. Outlet conduit 18 is located between exhaust conduit 19 and a respective groove 89, and houses a respective elastic element 91 consisting of a ring of elastomeric material. Body 82 is connected at the bottom to an outlet interface, which, in the variation shown in FIGS. 6 and 7, consists of a plate 99 having a central cavity 100 with a number of round circumferential appendixes 101. Each appendix 101 presents a hole 102 aligned with a respective exhaust conduit 19, and the center portion of cavity 100 forms a common chamber 103 connected to a single user device. Both holes 102 and cavity 100 are fitted normally with seals.

This therefore results in a variable capacity solenoid valve 73 for supplying the user device with varying amounts of air, depending on how many electromagnets 15 are activated. As such, inlet conduits 17 or outlet conduits 18 may either be the same or of different diameters for supplying varying amounts of air. Whatever the case, maximum air supply is always equal to the total supply of the number of base elements 74 activated.

Figure 8:
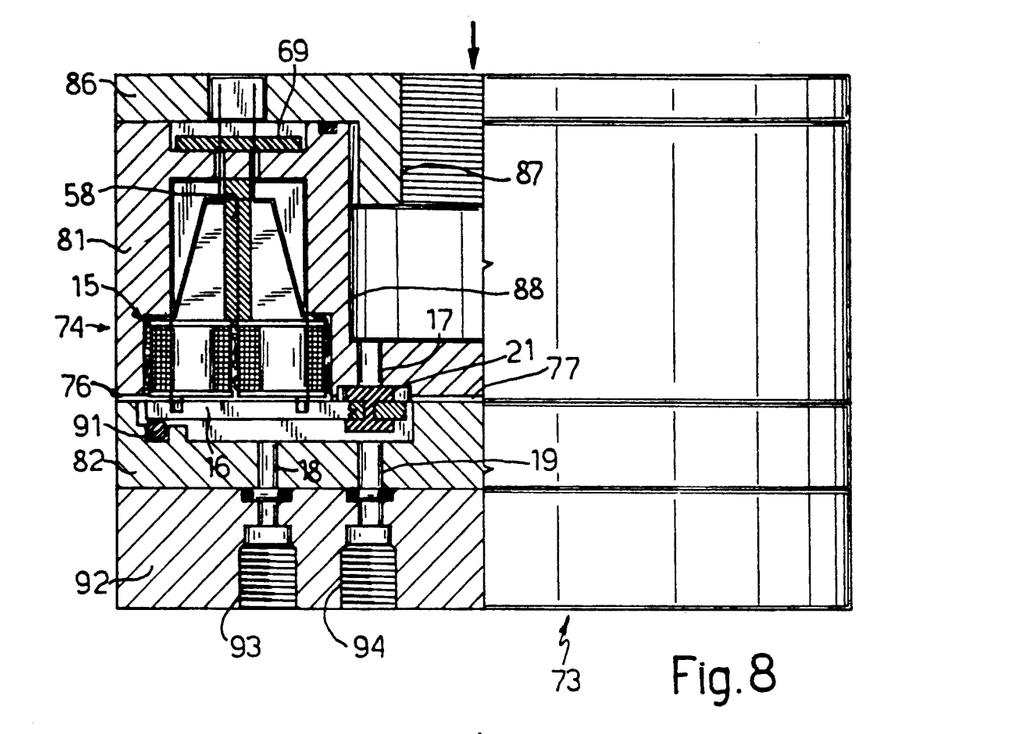
FIG. 8 shows the FIG. 5 section in a second operating position.

In the FIG. 8 variation, the outlet interface consists of a plate 92 having a number of outlet nozzles 93 aligned with respective outlet conduits 18; and a number of exhaust nozzles 94 aligned with respective exhaust conduits 19. Each nozzle 93, 94 is fitted with a seal for connection to body 82. Plate 92 provides for connecting multiple solenoid valve 73 to a number of similar, individually activatable user devices.

Figure 9:
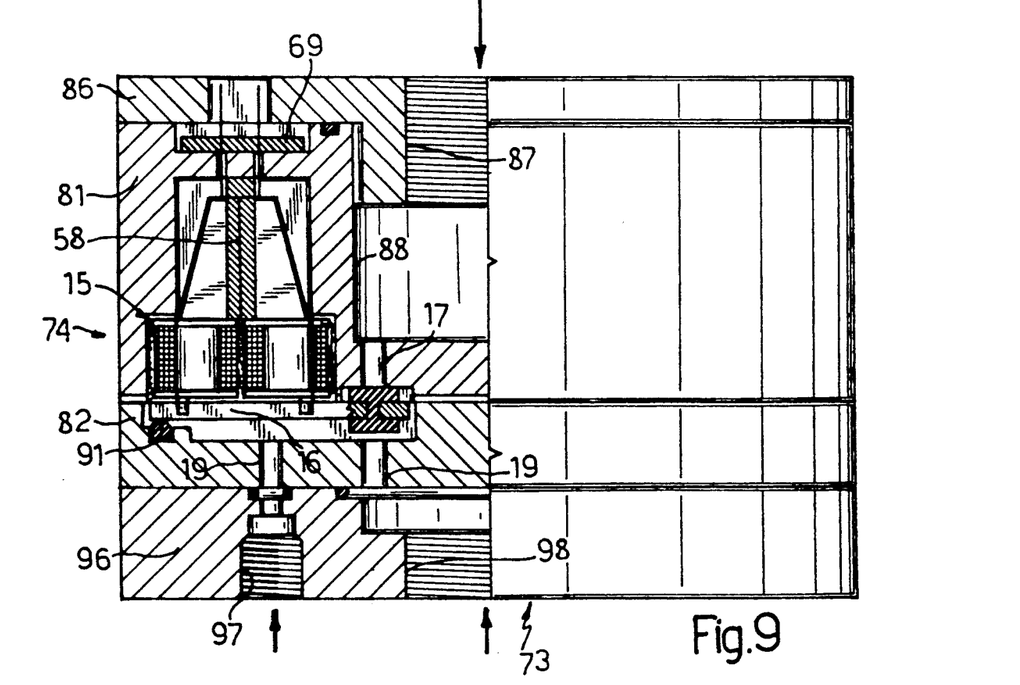
FIG. 9 shows the FIG. 5 section in a third operating position.

In the FIG. 9 variation, the outlet interface consists of a plate 96 having a number of outlet nozzles 97 aligned with respective outlet conduits 18; and a central opening 98 forming a common exhaust chamber. Both nozzles 97 and opening 98 are fitted normally with seals.

Figure 10:
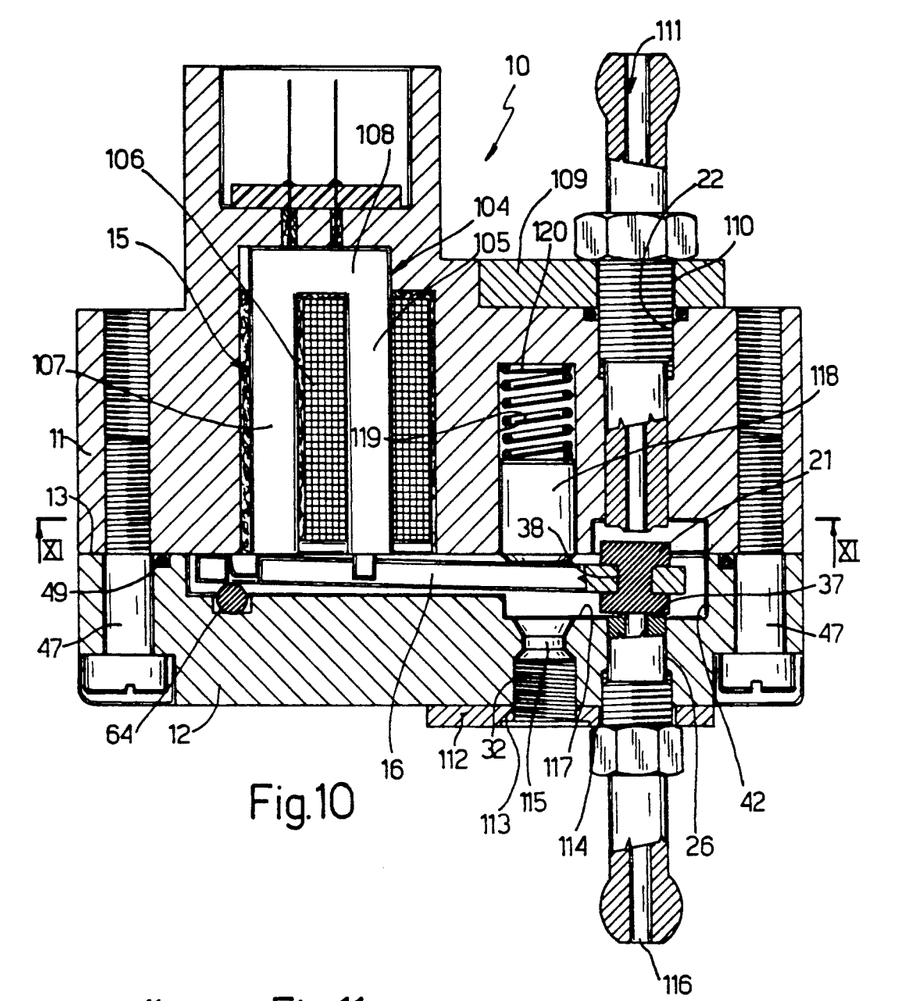
FIG. 10 shows a center section of a further embodiment of the solenoid valve according to the present invention.
Figure 11:
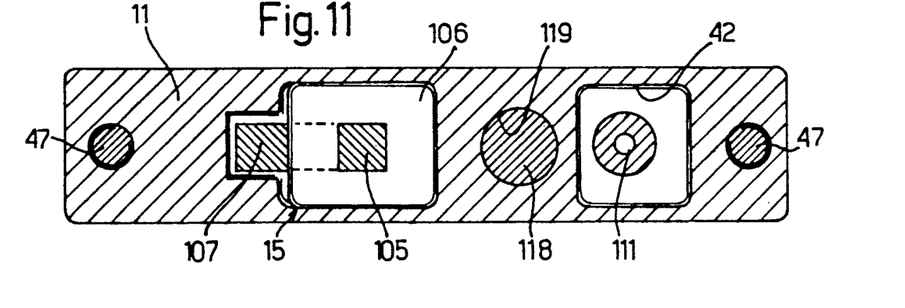
FIG. 11 shows a section along line XI—XI in FIG. 10.
Figure 12:
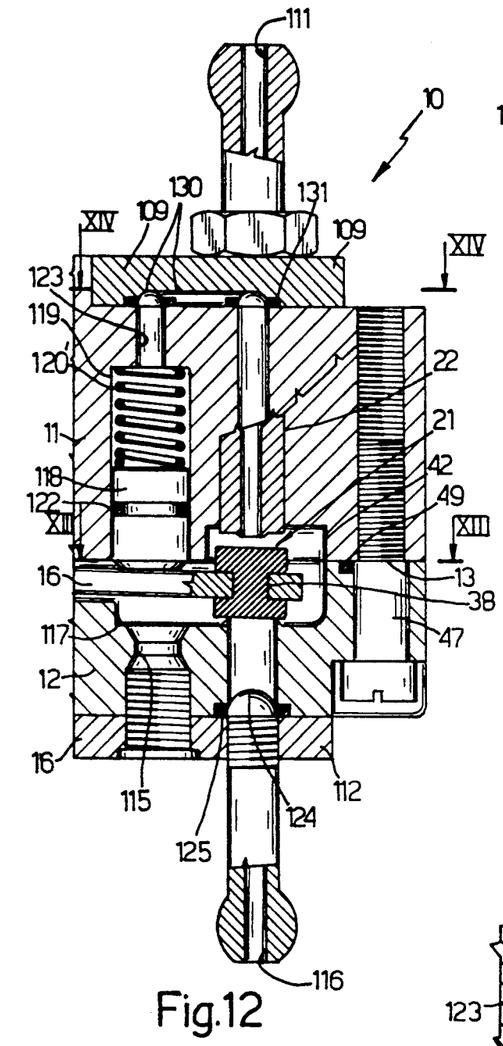
FIG. 12 shows a partial center section of a variation of the FIGS. 10 and 11 embodiment of the valve according to the present invention.
Figure 13:
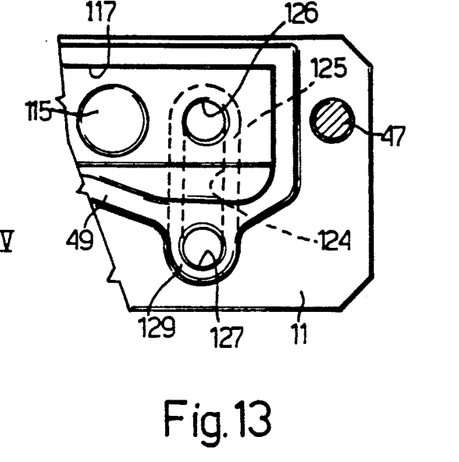
FIG. 13 shows a partial section along line XIII—XIII in FIG. 12.
Figure 14:
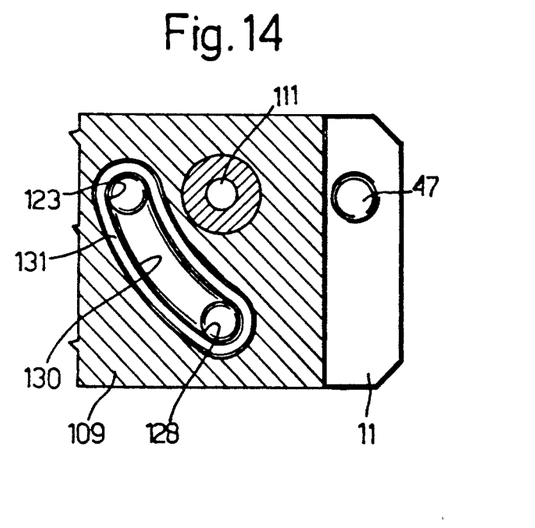
FIG. 14 shows a partial section along line VIV—XIV in FIG. 12.

In the FIG. 10 and 11 embodiment and FIG. 12-14 variation, the parts indicated using the same numbers as in the FIG. 1-3 embodiment perform the same function as in the latter and therefore require no further description. In the FIG. 10 and 11 embodiment, electromagnet 15 comprises a single magnetic core 104 having a square-section prismatic portion 105 wound with an electric coil 106; and a further prismatic portion 107 connected to portion 105 by a crosspiece 108. The free ends of portions 105 and 107 provide for arresting anchor 16 and so greatly simplifying electromagnet 15.

In this case, upper body 11 of solenoid valve 10 presents a plate 109 having a hole 110 aligned with hole 22 and fitted with an exhaust conduit 111. Lower body 12 in turn presents a plate 112 having two holes 113, 114 aligned respectively with holes 32, 26 and fitted respectively with an outlet conduit 115 and an inlet conduit 116. Inlet conduit 116 communicates with outlet conduit 115 via a recess 117 in compartment 42 between bodies 11 and 12.

When electromagnet 15 is de-energized, as in FIG. 10, anchor 16, together with on-off element 21, is positioned closing inlet conduit 116. For this purpose, provision is made for flexible means comprising a piston 118 sliding in a cylindrical seat 119 and pushed against anchor 16 by a force greater than that exerted by the compressed air in inlet conduit 116.

In particular, piston 118 may be pushed against anchor 16 by a compression spring 120 so sized as to maintain anchor 16, together with element 21, resting on end 37 of inlet conduit 116, as shown in FIG. 10. Solenoid valve 10 in FIGS. 10 and 11 operates in the same way as that of FIG. 1, and therefore requires no further description. In the FIG. 12-14 variation, piston 118 is pushed against anchor 16 by the compressed air fed into inlet conduit 116, the action of which is thus largely compensated. Provision is also preferably made, however, for a compression spring 120', weaker than spring 120, for which purpose, piston 118 is fitted with a seal 122.

Body 12 in turn presents a hole 126 fitted with inlet conduit 116 and terminating at the bottom in a straight, semicircular-section groove 124 (FIGS. 13 and 14) fitted with another seal 125. Groove 124 forms a transverse conduit between hole 126 of inlet conduit 116 and a conduit 127 parallel to conduit 116 and extending into a coaxial conduit 128 in body 11. Bodies 11 and 12 are sealed at conduits 127 and 128 by a ring-shaped appendix 129 on seal 49 of compartment 42.

Plate 109 presents a curved, semicircular-section groove 130 fitted with a third seal 131 and connecting conduit 128 to conduit 123 communicating with cylindrical seat 119. The section of piston 118 acted on by the compressed air is so sized that the torque produced on anchor 16 by spring 120' and the compressed air is greater than that produced by the air pressure on a given element 21 through hole 126.

In the FIG. 12-14 variation, spring 120' may of course be dispensed with by appropriately increasing the diameter of piston 118, thus further simplifying solenoid valve 10, in which case, the section of piston 118 will be much larger than that of hole 126. Spring 120', however, also provides for maintaining anchor 16 in the closed position over inlet conduit 116 if the compressed air supply is cut off, thus preventing movement or vibration of anchor 16 when supply is restored. Solenoid valve 10 in FIGS. 12-14 or in the variation without spring 120' operates in the same way as already described.

The advantages of the solenoid valve according to the present invention will be clear from the foregoing description. Firstly, permanent magnet 58 in the magnetic circuit of electromagnet 15 and the flexible action of pistone 118 on anchor 16 both provide for considerably improving the sensitivity and consequently the response time of solenoid valve 10 or base element 74. Secondly, the absence of servo valves greatly simplifies manufacture of both single three-way valve 10 and multiple valve 73.

To those skilled in the art it will be clear that changes may be made to the solenoid valves described and illustrated herein without, however, departing from the scope of the present invention. For example, the FIGS. 10 and 11 embodiment and the variation in FIGS. 12-14 may be adapted to form base elements 74 of a multiple valve 73; base elements 74 may be adapted to produce a multiple valve 73 of a different design; anchor 16 may be guided by appendixes on body 12 or 82; and permanent magnet 58 may be fitted differently to electromagnet 15. Finally, instead of being coaxial, inlet conduits 17, 116 and exhaust conduits 19, 111 may simply be arranged substantially facing each other, or in any manner enabling them to be closed and opened alternately and selectively by element 21 of anchor 16; and hole 22 of exhaust conduit 111 (FIGS. 10 and 11) may be fitted with a filter for damping the noise produced by operation of anchor 16.

I claim:

1. A high-speed, three-way solenoid valve for pressurized fluid, e.g. compressed air circuits, comprising first and second member bodies made of non-magnetic material and defining a common compartment, an inlet conduit, an outlet conduit, and an exhaust conduit, said conduits communicating with said compartment, said outlet conduit and one of said inlet and exhaust conduits being provided in said first member body, said inlet conduit and said exhaust conduit having each one a mouth axially aligned to each other, an on-off element made of elastomeric material and movable into said compartment between a first and a second operating position for alternately closing the mouth of said inlet conduit and of said exhaust conduit to selectively connect same with said outlet conduit, an electromagnet housed into a seat of said second member body and having two parallel pole pieces facing said compartment, and an armature for said electromagnet in form of a plate entirely housed into said compartment and supported so as to oscillate around a fulcrum lying close to an end of said plate, the opposite end of said plate being provided with a hole substantially coaxial with the mouth of said inlet and exhaust conduits to house said element, said electromagnet being energizable for moving said plate to bring said on-off element to said second position, wherein said member bodies directly mate on a common planar surface, said pole pieces having an end surface substantially coplanar with said surface, and the other one of said inlet and exhaust conduits being entirely provided in said second member body outside said electromagnet, and further including a cylindrical seat provided in said second member body perpendicularly to said surface, a piston slidably guided in said cylindrical seat, and a compression spring housed in said cylindrical seat for urging said piston toward said plate to bring and maintain said plate with said on-off element in said first position when said electromagnet is de-energized, said cylindrical seat being located in such a position as to cause said pistion to engage said plate in an intermediate portion between said fulcrum and said hole outside said electromagnet.

2. A solenoid valve as claimed in claim 1, wherein said on-off element is comprised of a pair of opposite disks, said disks integral and connecting with each other through said hole and adapted to engage respectively the mouth of said inlet conduit and the mouth of said outlet conduit, said disks having a diameter greater than the diameter of said hole.

3. A solenoid valve as claimed in claim 1, wherein said conduits are perpendicular to said surface and are entirely rectilinear across said member bodies.

4. A solenoid valve as claimed in claim 1, wherein said cylindrical seat communicates with said inlet conduit, the section of said cylindrical seat being so sized that the torque produced on said plate by both said spring and the compressed air from said inlet conduit is greater than the torque produced by said compressed air on said element.

* * * * *

UNITED STATES PATENT AND TRADEMARK OFFICE
CERTIFICATE OF CORRECTION

PATENT NO.   : 5,318,071
DATED        : June 7, 1994
INVENTOR(S)  : Mario Gaiardo It is certified that error appears in the above-identified patent and that said Letters Patent is hereby corrected as shown below:

Column 6, line 34, delete "pistone" and insert --piston--.

Signed and Sealed this

Eleventh Day of October, 1994

Attest:

BRUCE LEHMAN

*Attesting Officer*                *Commissioner of Patents and Trademarks*